United States Patent
Kaushik et al.

(10) Patent No.: US 12,549,824 B2
(45) Date of Patent: Feb. 10, 2026

(54) MACHINE NARRATION

(71) Applicant: Sony Interactive Entertainment Inc., Tokyo (JP)

(72) Inventors: Lakshmish Kaushik, San Mateo, CA (US); Coimbatore Ravi Madhavan, San Mateo, CA (US); Sharath Rao, San Mateo, CA (US); Kusha Sridhar, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/780,894

(22) Filed: Jul. 23, 2024

(65) Prior Publication Data

US 2026/0032322 A1    Jan. 29, 2026

(51) Int. Cl.
| | |
|---|---|
| *H04N 21/81* | (2011.01) |
| *G10L 13/027* | (2013.01) |
| *G10L 25/63* | (2013.01) |
| *G10L 25/84* | (2013.01) |
| *A63F 13/60* | (2014.01) |

(52) U.S. Cl.
CPC ....... *H04N 21/8106* (2013.01); *G10L 13/027* (2013.01); *G10L 25/63* (2013.01); *G10L 25/84* (2013.01); *A63F 13/60* (2014.09)

(58) Field of Classification Search
None
See application file for complete search history.

(56) References Cited

U.S. PATENT DOCUMENTS

| | | | | |
|---|---|---|---|---|
| 2020/0204878 A1* | 6/2020 | Canton | .................. | G11B 27/10 |
| 2022/0394323 A1* | 12/2022 | Aher | .................. | H04N 21/8133 |
| 2024/0177728 A1* | 5/2024 | Palaniappan | ........... | G06F 40/30 |
| 2024/0394755 A1* | 11/2024 | Ding | ..................... | G06V 10/70 |

OTHER PUBLICATIONS

Cen et al., "Segment Any 3D Gaussians," CoRR, Submitted on May 27, 2024, arXiv:2312.00860v2, 17 pages.
https://colmap.github.io/ [online], "COLMAP", avaialble on or before Apr. 28, 2016, retrieved on Jun. 15, 2024, retrieved from URL<https://colmap.github.io/>, 3 pages.
Hu et al., "GaussianAvatar: Towards Realistic Human Avatar Modeling from a Single Video via Animatable 3D Gaussians," Proceedings of the IEEE/CVF Conference on Computer Vision and Pattern Recognition, 2024, pp. 634-644.
Smith et al., "FlowMap: High-Quality Camera Poses, Intrinsics, and Depth via Gradient Descent," CoRR, Submitted on Jul. 23, 2024, arXiv:2404.15259v3, 28 pages.
U.S. Appl. No. 18/780,973, filed Jul. 23, 2024, Taylor et al.
U.S. Appl. No. 18/781,823, filed Jul. 23, 2024, Taylor et al.

* cited by examiner

*Primary Examiner* — Junior O Mendoza
(74) *Attorney, Agent, or Firm* — Fish & Richardson P.C.

(57) ABSTRACT

A technique for generating and inserting voice narration about action in audio-video (AV) content such as a movie or computer game includes generating the narration, e.g., from dialog in the AV content, and determining how and when to insert portions of the narration into the AV content so as not to interfere with dialog in the content.

20 Claims, 6 Drawing Sheets

Script

| Time ~500 | Action ~502 | Dialog ~504 |
|---|---|---|
| 1 | Man in Hat Walking | "Hi There" |
| 5 | Man Stops Long Pause | "What's Up?" |
| 15 | Man Resumes Walking | "Well, Gotta Go" |

FIG. 5

Narration

| Time ~600 | Audio ~602 | Duration ~604 |
|---|---|---|
| 1 | He Says Hi | 2 Seconds |
| 4 | Then He Keeps Walking, And... | 6 Seconds |
| 8 | He Wants To Know What's up | 5 Seconds |

FIG. 6

MACHINE NARRATION

FIELD

The present application relates generally to machine narration and more particularly to generating and inserting narration of audio-video content into the content without interfering with dialog.

BACKGROUND

As understood herein, for a variety of reasons including accessibility and general enjoyment, it can be helpful to listen to a narrative of action or dialog occurring in audio video content such as in movies and computer games. As also recognized herein, generating the narration and inserting it into the AV content so as not to interfere with the dialog or music of the AV content can be a time-consuming and cumbersome chore.

SUMMARY

Accordingly, an apparatus includes at least one processor system configured generate audio of narration for an audio-video (AV) content. The processor system also is configured to identify, in the AV content, gaps in dialog within the AV content, and for at least some gaps, identify respective segments of the audio of narration that temporally fit in the respective gaps. The processor system is configured to combine the segments of the audio of narration with the AV content within the respective gaps.

In some embodiments, the processor system can be configured to establish a loudness of the audio of narration according to a loudness in audio in the AV content. If desired, the processor system may be configured to identify a speaker of dialog in the AV content, and generate the audio of narration in an emotion according to an emotion in audio of the speaker of dialog. In some implementations the processor system can be configured to change a speed of playback of at least a segment of the audio of narration according to at least one duration of at least one of the gaps such that the segment of the audio of narration fits within the duration of the gap.

In example embodiments, the processor system is configured to identify narration text, and generate the audio of narration from the narration text using voice synthesis. The narration text may be receive from at least one large language model (LLM). Example AV content can include computer game content, and the processor system can be part of a computer game console and/or computer game server.

In another aspect, a method includes generating audio of narration of an audio-video (AV) content. The method then includes aligning the audio of narration with dialog and/or music in the AV content, and playing the audio of narration in the AV content only in gaps of dialog and/or music in the AV content.

In another aspect, a device includes computer memory not a transitory signal and that in turn includes instructions executable by at least one processor system to, using dialog of audio-video (AV) content, generate audio of narration, and play the audio of narration only during gaps in audio of the dialog in the AV content.

The details of the present application, both as to its structure and operation, can be best understood in reference to the accompanying drawings, in which like reference numerals refer to like parts, and in which:

BRIEF DESCRIPTION OF THE DRAWINGS

FIG. 5 illustrates a portion of an example script illustrating certain metadata;

FIG. 6 illustrates a portion of an example narration;

DETAILED DESCRIPTION

Figure 1:
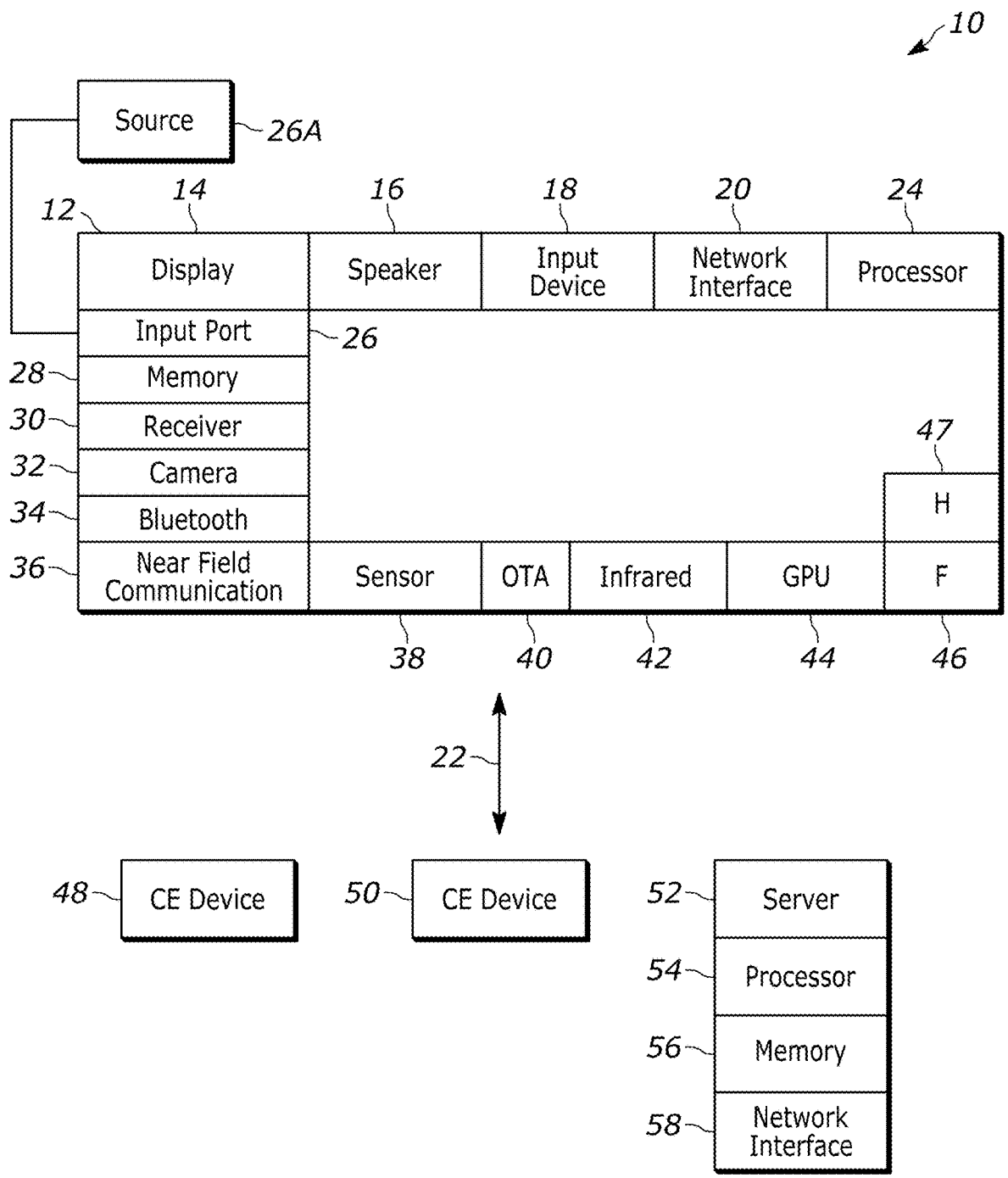
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
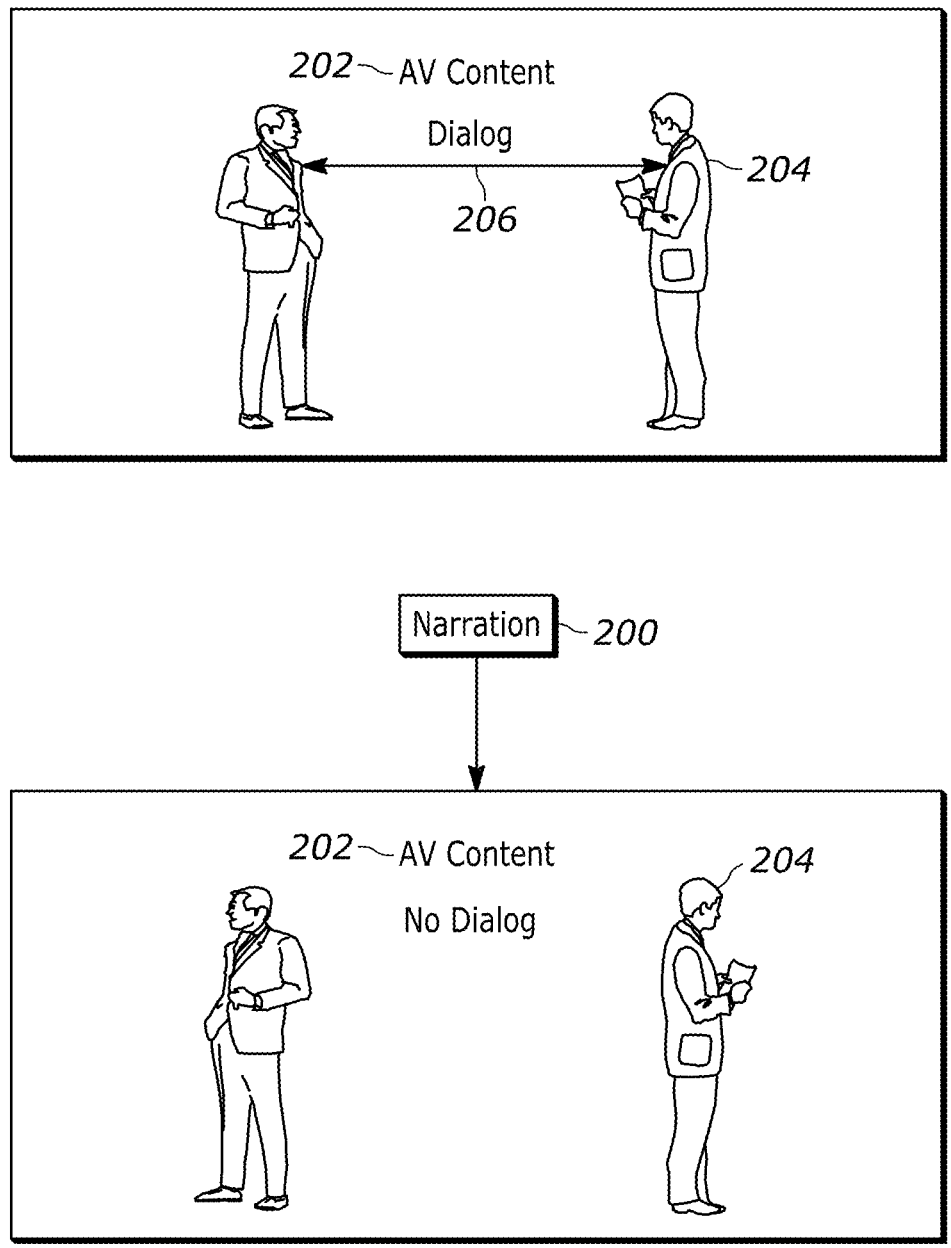
FIG. 2 illustrates example screen shots of audio-video (AV) content schematically showing narration.

Turn now to FIG. 2. Narration 200 in audio form is shown schematically for insertion into the audio of AV content 202. In the top frame two speakers 204 are illustrated speaking dialog 206. In the bottom frame the two speakers are no longer conversing so there is no dialog. Responsive to there being current dialog 206, the narration 200 is not played in the top frame; however, responsive to no dialog being currently spoken, the narration may be played along with whatever background audio may be currently played in the AV content. Note that while FIG. 2 illustrates that narration 200 is played only when there is no current dialog so as to not interfere with the speaking of AV content words, narration 200 in addition or alternatively may be played only when there is no music being played in the AV audio.

The AV content 202 may be a movie or other show such as a drama, serial, or any other visual medium. Alternatively, the AV content may be a computer game, in which case present techniques may be executed by one or more gaming devices such as servers and consoles.

Figure 3:
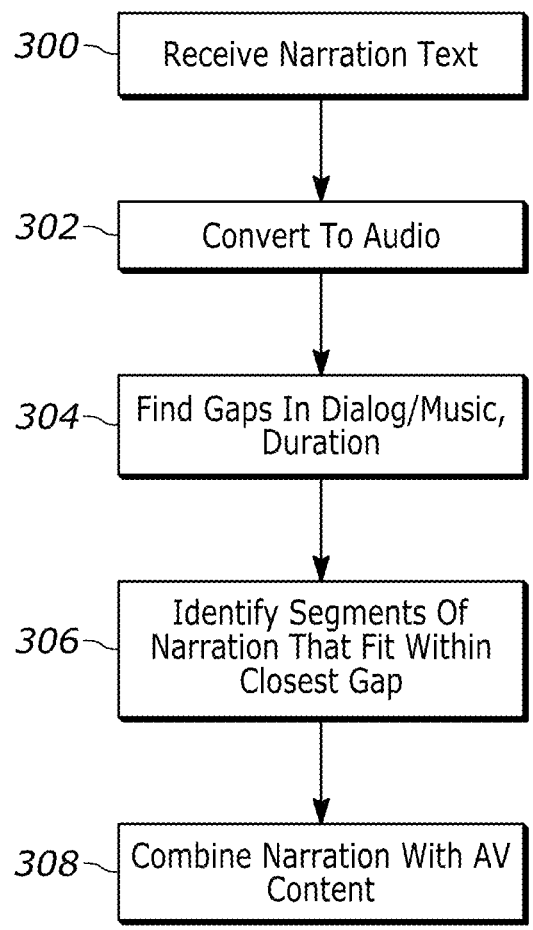
FIG. 3 illustrates example high level logic in example flow chart format.

FIG. 3 illustrates overall logic. Commencing at state 300, text of narration is received for an AV content. Typically, the narration is derived from the dialog in the AV content. In addition or alternatively it may be derived from the script, which includes not just dialog but also metadata such as scene description, what action the actors/characters are executing, emotions or other signals expressed by the actors/characters, etc. The narration text may be authored by a human expert or as more fully discussed below by a large language model (LLM). Note that while the narration may be based on the dialog, it is not a verbatim repeat of the dialog, but rather an explanation as to what is occurring in the AV content.

Proceeding to state 302, the narration text is converted to audio to generate audio of narration for the AV content. This may be done using, e.g., voice synthesis.

From state 302 the logic moves to state 304 to identify, in the AV content, gaps in dialog within the AV content. As mentioned above, alternatively or in addition, gaps in music soundtracks of the AV content may be identified. The durations of the gaps are also identified using, e.g., metadata or timestamps in a script of the AV content or subtitles in the AV content as discussed further herein.

Moving from state 304 to state 306, for at least some of the gaps, respective segments of the audio of narration are identified that temporally fit in the respective gaps. Typically the audio of narration is time-synchronized with the AV audio by aligning, for example, timestamps of the audio of narration with timestamps or other timing information in the AV content. The segment of audio of narration closest to a gap may be identified and if the duration of that segment is short enough to fit within the gap, it may be incorporated into or embedded within or otherwise played with the audio of the AV content during the gap at state 308. Otherwise, if there is no narration within a threshold temporal span of the gap, or if the identified segment is too long to fit within the gap, the audio of narration is not played during the gap to avoid interfering with dialog in the AV content.

It should be noted that the narration may be generated by first identifying gaps in the AV content dialog, and then generating segments of narration that have a sufficiently short playback duration to fit within the gaps. The AV audio may be used to discover an initial alignment of what is happening in the AV content as the dialog is being spoken to generate timing information which, along with scene information (context) from the script can be used to generate a small "chunk" of narration for that portion of the AV content assuming an acceptable segment of narration can be generated. Or, the narration may be a continuous summary along a timeline, with segments of the continuous summary isolated with a sufficiently short duration to add to the audio of the AV content at the appropriate point in the timeline.

Figure 4:
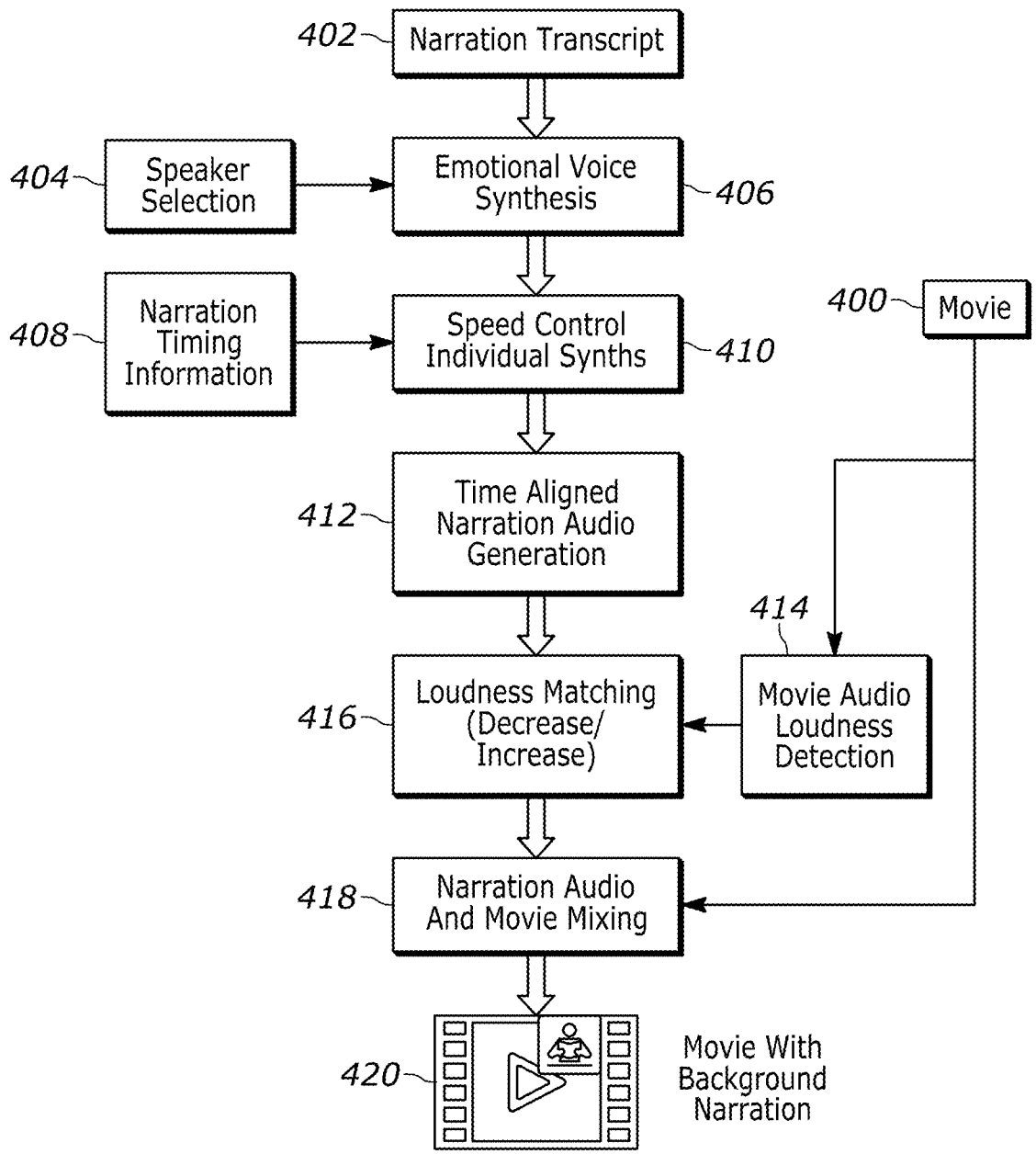
FIG. 4 illustrates example detailed logic in example flow chart format.

FIG. 4 illustrates further details of present principles for developing accessibility features for visually challenged viewers of AV content 400 such as a movie, namely, the narration discussed herein. A narration transcript 402 is identified that narrates in the background of the AV content audio what is occurring in the AV content. The transcript may be related to a scene, actions, actors, or any other useful information.

State 404 in FIG. 4 indicates that one of the speakers in the AV content, i.e., one of the actors or characters that speak dialog, is selected. The voice of that speaker and the emotion in the voice as determined by emotion recognition machine learning (ML) principles can be used at state 406 to synthesize the transcript 402 into dialog. Thus, as the emotion of the selected speaker changes, the emotion of the audio of narration changes accordingly, e.g., to follow the emotion of the selected speaker.

State 408 represents narration timing information such as timestamps accompanying the speech in the audio stream representing the narration. The timing information may also include timing accompanying the audio in the AV content indicating when dialog and/or music is occurring. As indicated above, the timing accompanying the audio in the AV content may be derived from metadata associated with the AV content such as script directions, subtitles in the video of the AV content, etc.

State 410 indicates that for narration segments exceeding the durations of concurrent gaps in dialog/music in the AV content, the speed of the audio of the narration may be sped up (or slowed down to fill a long gap with shorter narration). The two parallel audio streams, i.e., the audio of the narration and the audio from the AV content, once aligned, establish time aligned narration audio generation 412.

The loudness 414 of the AV content 400 also is identified and used to alter the loudness of the audio of narration at state 416. Thus, as the loudness of dialog and/or music in the AV content changes, the loudness of the audio of narration changes accordingly. For example, for louder portions of audio in the AV content, the corresponding segments of audio of narration may be made louder. For quieter portions of audio in the AV content, the corresponding segments of audio of narration may be made quieter.

The logic moves from state 416 to state 418 to mix the audio of narration with the audio of the AV content. The AV content with background narration is then played at state 420.

FIGS. 5 and 6 respectively represent time-aligned audio from the script of the AV content and audio of narration. In FIG. 5, a timestamp column 500 is registered with a descriptive column 502 indicating what is happening at that timestamp and a dialog column 504 indicating what dialog, if any, is being spoken. Similarly, in FIG. 6, a timestamp column 600 is registered with a descriptive column 602 indicating what the corresponding segment of audio of narration is and a duration column 604 indicating the duration of the segment of audio of narration. By aligning the two audio streams according to the timestamps, it can be determined whether a segment of narration in column 602 of FIG. 6 can be played between dialog indicated in FIG. 5 based on the duration of the segment of audio of narration in column 604.

Figure 7:
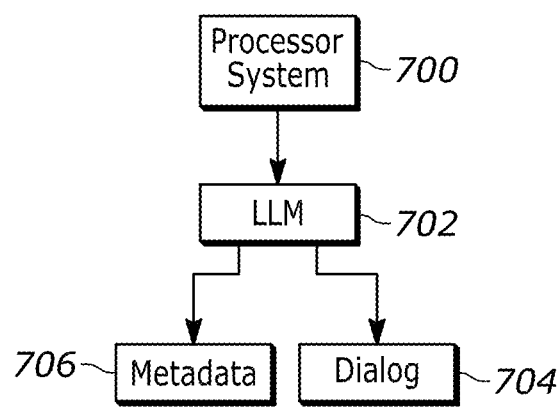
FIG. 7 illustrates an example system using a large language model (LLM) to generate the narration.

FIG. 7 illustrates a processor system 700 executing a LLM 702 to generate the narration transcript. The LLM 702 may access dialog 704 from the AV content as well as metadata 706 from the AV content, such as information in the script about a scene, direction controls such as where actors stand, etc. Using the metadata 706 and dialog 704, the LLM outputs a narration transcript.

Figure 8:
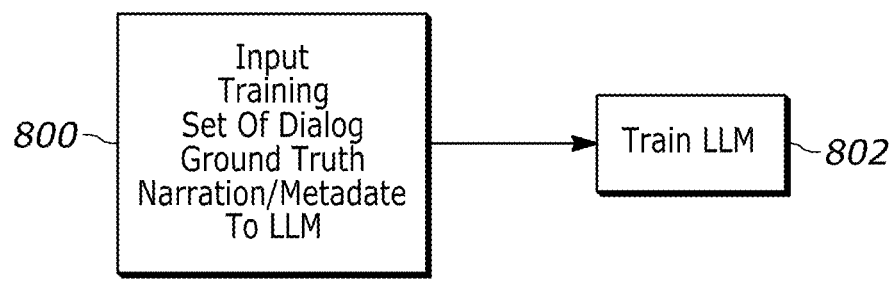
FIG. 8 illustrates example LLM training logic in example flow chart format.

FIG. 8 illustrates example training logic for the LLM 702. State 800 indicates that a training corpus of information including sets of dialogs and accompanying metadata along with ground truth narration transcripts for the dialog is input to the LLM to train the LLM at state 802.

While the particular embodiments are herein shown and described in detail, it is to be understood that the subject matter which is encompassed by the present invention is limited only by the claims.

What is claimed is:
1. An system comprising:
   one or more computers processors; and
   one or more non-transitory computer-readable media that store instructions which, when executed, cause the one or more computer processors to perform operations comprising:
   generating a segment of audio of narration for an audio-video (AV) content;
   identifying, in the AV content, a gap in dialog within the AV content;
   identifying that the segment of the audio of narration temporally fit in the identified gap, comprising:
      comparing one or more timestamps that are associated with the segment of the audio narration for the AV content with one or more timestamps that are associated with the gap in dialog within the AV content, and
      determining, based at least on comparing the one or more timestamps that are associated with the segment of the audio narration for the AV content with the one or more timestamps that are associated with the gap in dialog within the AV content, that the segment of the audio of the narration occurs within a threshold temporal span of the gap; and after determining that the segment of the audio of the narration occurs within a threshold time span of the gap, combining the segment of the audio of narration with the AV content within the gap.

2. The system of claim 1, wherein the segment of the audio of narration is generated before the gap is identified.

3. The system of claim 1, wherein the segment of the audio of narration is generated after the gap is identified.

4. The system of claim 1, wherein the segment is combined only after determining that the segment of the audio of the narration occurs within a threshold time span of the gap.

5. The system of claim 1, wherein identifying the gap in dialog within the AV comprises identifying a portion of the AV content in which there is no talking and in which there is no music.

6. The system of claim 1, where the segment of the audio is generated to match an emotion of a scene of the AV content which includes the gap.

7. The system of claim 1, wherein a duration of the segment that is generated is determined based at least on a duration of the gap.

8. One or more non-transitory computer-readable media that store instructions which, when executed, cause one or more computer processors to perform operations comprising:
   generating a segment of audio of narration for an audio-video (AV) content;
   identifying, in the AV content, a gap in dialog within the AV content;
   identifying that the segment of the audio of narration temporally fit in the identified gap, comprising:
      comparing one or more timestamps that are associated with the segment of the audio narration for the AV content with one or more timestamps that are associated with the gap in dialog within the AV content, and
      determining, based at least on comparing the one or more timestamps that are associated with the segment of the audio narration for the AV content with the one or more timestamps that are associated with the gap in dialog within the AV content, that the segment of the audio of the narration occurs within a threshold temporal span of the gap; and
   after determining that the segment of the audio of the narration occurs within a threshold time span of the gap, combining the segment of the audio of narration with the AV content within the gap.

9. The media of claim 8, wherein the segment of the audio of narration is generated before the gap is identified.

10. The media of claim 8, wherein the segment of the audio of narration is generated after the gap is identified.

11. The media of claim 8, wherein the segment is combined only after determining that the segment of the audio of the narration occurs within a threshold time span of the gap.

12. The media of claim 8, wherein identifying the gap in dialog within the AV comprises identifying a portion of the AV content in which there is no talking and in which there is no music.

13. The media of claim 8, where the segment of the audio is generated to match an emotion of a scene of the AV content which includes the gap.

14. The media of claim 8, wherein a duration of the segment that is generated is determined based at least on a duration of the gap.

15. A computer-implemented method comprising:
   generating a segment of audio of narration for an audio-video (AV) content;
   identifying, in the AV content, a gap in dialog within the AV content;
   identifying that the segment of the audio of narration temporally fit in the identified gap, comprising:
      comparing one or more timestamps that are associated with the segment of the audio narration for the AV content with one or more timestamps that are associated with the gap in dialog within the AV content, and
      determining, based at least on comparing the one or more timestamps that are associated with the segment of the audio narration for the AV content with the one or more timestamps that are associated with the gap in dialog within the AV content, that the segment of the audio of the narration occurs within a threshold temporal span of the gap; and
   after determining that the segment of the audio of the narration occurs within a threshold time span of the gap, combining the segment of the audio of narration with the AV content within the gap.

16. The method of claim 15, wherein the segment of the audio of narration is generated before the gap is identified.

17. The method of claim 15, wherein the segment of the audio of narration is generated after the gap is identified.

18. The method of claim 15, wherein the segment is combined only after determining that the segment of the audio of the narration occurs within a threshold time span of the gap.

19. The method of claim 15, wherein identifying the gap in dialog within the AV comprises identifying a portion of the AV content in which there is no talking and in which there is no music.

20. The method of claim 15, where the segment of the audio is generated to match an emotion of a scene of the AV content which includes the gap.

* * * * *